United States Patent [19]
Keipert et al.

[11] Patent Number: 5,911,789
[45] Date of Patent: Jun. 15, 1999

[54] LINEAR ACTUATOR FOR MOTOR VEHICLE STEERING COLUMN

[75] Inventors: Frank Robert Keipert, Bay City; James Richard Salois, Midland, both of Mich.

[73] Assignee: General Motors Corporation, Detroit, Mich.

[21] Appl. No.: 08/910,168

[22] Filed: Aug. 13, 1997

[51] Int. Cl.⁶ .............................. B62D 1/18; F16H 27/02
[52] U.S. Cl. ............................ 74/493; 74/459; 74/89.15; 74/424.8 A; 280/775
[58] Field of Search ............................ 74/493.03, 89.15, 74/459, 424.8 A; 280/775; 411/431, 433, 291

[56] References Cited

U.S. PATENT DOCUMENTS

| | | | |
|---|---|---|---|
| 838,948 | 12/1906 | Bryar | 411/291 |
| 1,852,203 | 4/1932 | Easter | 411/291 |
| 2,282,641 | 5/1942 | Corey | 285/140 |
| 3,031,897 | 5/1962 | Seidel | 74/441 |
| 3,124,969 | 3/1964 | Grabowski et al. | 74/441 |
| 3,265,109 | 8/1966 | Hanfland | 151/21 |
| 4,557,652 | 12/1985 | Lundgren | 411/230 |
| 4,691,587 | 9/1987 | Farrand et al. | 74/493 |
| 4,729,703 | 3/1988 | Sato | 411/5 |
| 4,872,795 | 10/1989 | Davis | 411/433 |
| 4,954,032 | 9/1990 | Morales | 74/424.8 A |
| 4,967,618 | 11/1990 | Matsumoto et al. | 74/493 |
| 5,263,381 | 11/1993 | Shirai | 74/441 |
| 5,333,905 | 8/1994 | Watanabe | 74/89.15 X |
| 5,590,565 | 1/1997 | Palfenier et al. | 74/493 |
| 5,690,362 | 11/1997 | Peitsmeier et al. | 280/775 |
| 5,769,377 | 6/1998 | Gauger | 74/89.15 |

*Primary Examiner*—John A. Jeffery
*Assistant Examiner*—Marcus Charles
*Attorney, Agent, or Firm*—Saul Schwartz; Robert M. Sigler

[57] ABSTRACT

A linear actuator including a socket on a first element of a motor vehicle steering column, an expandable nut loosely disposed in the socket, and a screw shaft rotatably supported on a second element of the steering column. The expandable nut consists of a front segment facing a distal end of the screw shaft and a back segment behind the front segment. An inside screw thread in the back segment of the expandable nut is angularly phased relative to an inside screw thread in the front segment. The expandable nut self-aligns with the screw shaft when the latter is screwed into the inside screw thread in the front segment. An outboard end of the thread groove in the screw shaft defining the outside screw thread thereon spreads apart the front and back segments of the expandable nut to positions resiliently wedged between the screw shaft and the socket to eliminate lash between the screw shaft and the first element of the steering column. In a preferred embodiment, the expandable nut is a molded plastic nut having front and back segments connected by an integral living hinge.

1 Claim, 3 Drawing Sheets

LINEAR ACTUATOR FOR MOTOR VEHICLE STEERING COLUMN

TECHNICAL FIELD

This invention relates to a linear actuator between relatively adjustable elements of a motor vehicle steering column.

BACKGROUND OF THE INVENTION

U.S. Pat. No. 5,590,565, issued Jan. 7, 1997 and assigned to the assignee of this invention, describes a motor vehicle steering column including a stationary outer mast jacket, an inner mast jacket mounted on the outer mast jacket for linear translation, a tilt head pivotally mounted on the inner mast jacket, and a steering hand wheel rotatably supported on the tilt head. A first linear actuator translates the inner mast jacket in and out to adjust the longitudinal position of the steering hand wheel. A second linear actuator pivots the tilt head up and down to adjust the vertical position of the steering hand wheel. The linear actuators each include an electric motor driven screw shaft on respective ones of the outer and the inner mast jackets and a connecting rod having a tubular nut at one end around the screw shaft and a ball stud at the other end attached to a corresponding one of the inner mast jacket and the tilt head. Rotation of the screw shafts in the tubular nuts induces linear translation of the connecting rods to move the inner mast jacket in and out and to pivot the tilt head up and down. A linear actuator according to this invention is a novel alternative to the linear actuators described in the aforesaid U.S. Pat. No. 5,590,565.

SUMMARY OF THE INVENTION

This invention is a new and improved linear actuator for adjusting the position of a first element of a motor vehicle steering column relative to a second element of the steering column. The linear actuator includes a socket on the first element, an expandable nut loosely disposed in the socket, and a screw shaft rotatably supported on the second element. The expandable nut consists of a front segment facing a distal end of the screw shaft and a back segment behind the front segment. An inside screw thread in the back segment of the expandable nut is angularly phased relative to an inside screw thread in the front segment of the expandable nut. The expandable nut self-aligns with the screw shaft when the latter is screwed into the inside screw thread in the front segment. An outboard end of the thread groove in the screw shaft defining the outside screw thread thereon spreads apart the front and back segments of the expandable nut to positions resiliently wedged between the screw shaft and the socket when the screw shaft is threaded serially into the inside screw threads in the front and the back segments to eliminate lash between the screw shaft and the first element of the steering column. In a preferred embodiment, the expandable nut is a molded plastic nut having front and back segments connected by an integral living hinge.

DESCRIPTION OF THE PREFERRED EMBODIMENT

Figure 1:
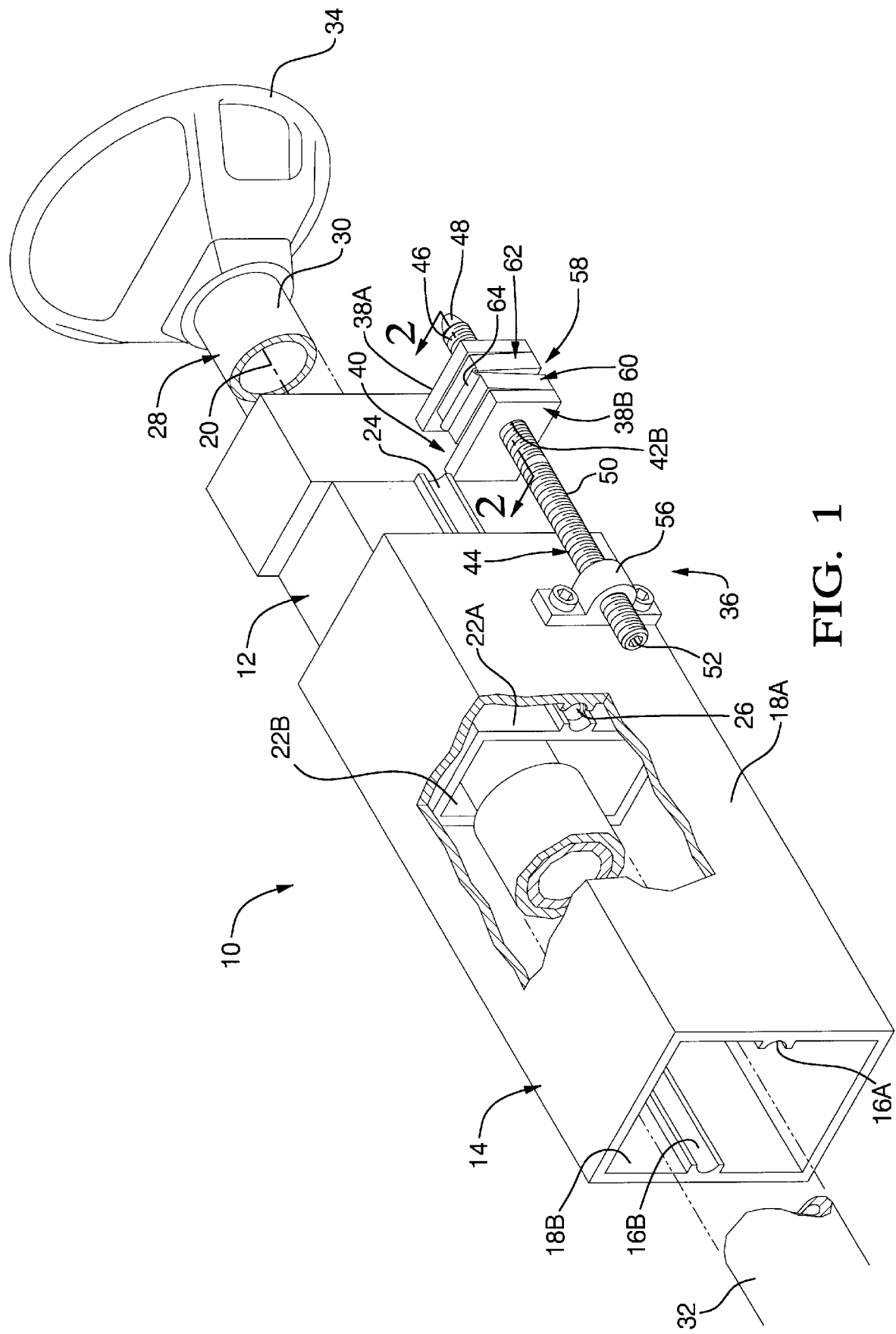
FIG. 1 is a perspective view of a linear actuator according to this invention on a length adjustable motor vehicle steering column.
Figure 4:
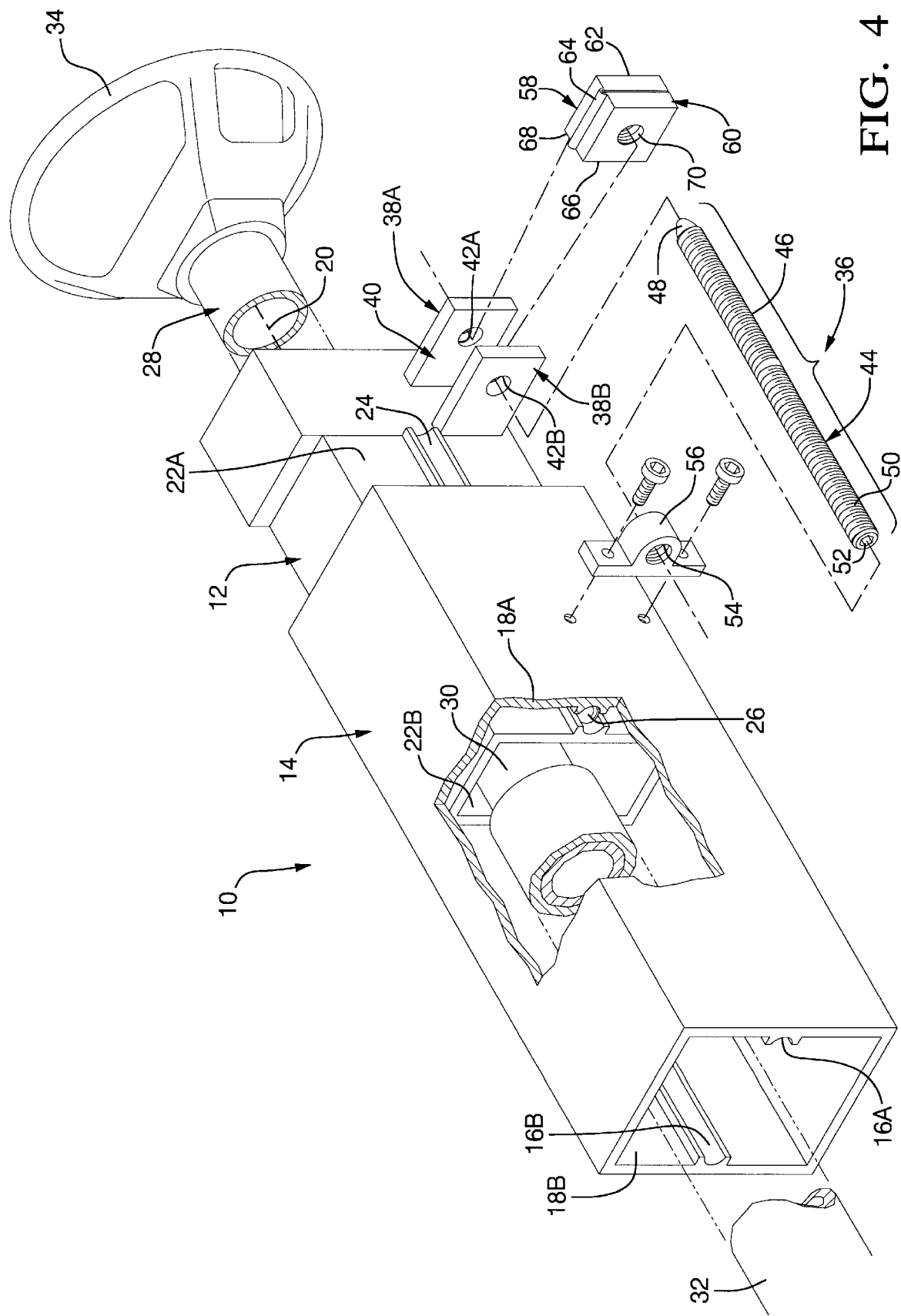
FIG. 4 is an exploded perspective view of the linear actuator according to this invention on the aforesaid length adjustable motor vehicle steering column.

As seen best in FIGS. 1 and 4, a schematically represented length adjustable motor vehicle steering column 10 includes a first element or inner mast jacket 12 telescoped inside of a second element or outer mast jacket 14. The outer mast jacket may be rigidly attached to a motor vehicle body, not shown. A pair of tracks 16A, 16B on respective ones of a pair of vertical sides 18A, 18B of the outer mast jacket parallel to a longitudinal centerline 20 of the steering column face a corresponding pair of tracks on respective ones of a pair of vertical sides 22A, 22B of the inner mast jacket 12, only a single track 24 on the vertical side 22A of the inner mast jacket being visible in FIGS. 1 and 4. A plurality of bearings 26 between the facing pairs of tracks support the inner mast jacket on the outer mast jacket for in and out linear translation in the direction of the longitudinal centerline 20 of the steering column.

A schematically represented steering shaft 28 of the steering column 10 is supported on the inner and the outer mast jackets 12, 14 for rotation about the longitudinal centerline 20 of the steering column. An upper portion 30 of the steering shaft slidably telescopes in a lower portion 32 of the steering shaft for uninterrupted torque transfer therebetween during relative linear translation between the inner and the outer mast jackets. A steering hand wheel 34 is rigidly attached to the upper portion 30 of the steering shaft. A linear actuator 36 according to this invention induces relative linear translation between the inner and the outer mast jackets to vary the length of the steering column 10 and thereby adjust the longitudinal position of the steering hand wheel 34 on the aforesaid motor vehicle body.

Figure 2:
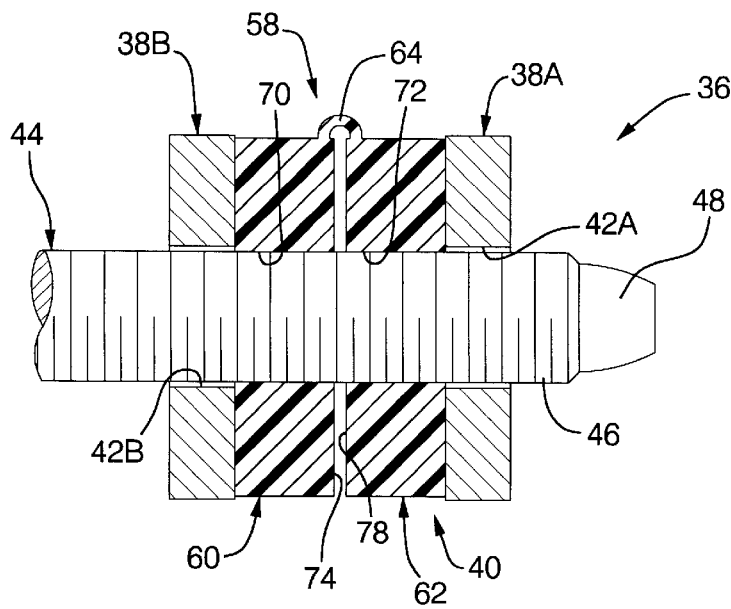
FIG. 2 is a sectional view taken generally along the plane indicated by lines 2—2 in FIG. 1.

As seen best in FIGS. 1, 2 and 4, a pair of rectangular lugs 38A, 38B on the inner mast jacket 12 perpendicular to the vertical side 22A thereof cooperate in defining a socket 40 of the linear actuator 36 on the inner mast jacket. The lugs 38A, 38B are perforated by respective ones of a pair of clearance holes 42A, 42B. A screw shaft 44 of the linear actuator 36 has a right-hand lead outside screw thread 46 thereon from a first distal end 48 of the screw shaft to the middle of the screw shaft and a left-hand lead outside screw thread 50 thereon from a second distal end 52 of the screw shaft to the middle of the screw shaft. The screw shaft 44 traverses the socket 40 through the clearance holes 42A, 42B in the lugs 38A, 38B. The left-hand lead outside screw thread 50 cooperates with a corresponding inside screw thread 54 on a lug 56 rigidly attached to the vertical side 18A of the outer mast jacket 14 in rotatably supporting the screw shaft on the outer mast jacket generally parallel to the centerline 20 of the steering column.

An expandable nut 58 of the linear actuator 36 is disposed in the socket 40 on the inner mast jacket 12 around the right-hand lead outside screw thread 46 on the screw shaft 44. The expandable nut includes a front segment 60 facing the lug 38B, a back segment 62 facing the lug 38A, and an integral living hinge 64 between the front and the back segments. An edge 66, FIG. 4, of the front segment 60 and a corresponding edge 68 of the back segment 62 cooperate with the vertical side 22A of the inner mast jacket 12 in preventing rotation of the expandable nut 58 in the socket 40.

An inside screw thread 70 on the front segment 60 of the expandable nut and an inside screw thread 72 on the back segment 62 of the expandable nut cooperate with the right-hand lead outside screw thread 46 on the screw shaft 44 in inducing linear translation of the inner mast jacket 12 of the steering column relative to the outer mast jacket 14 in response to rotation of the screw shaft. By virtue of the right-hand lead and the left-hand lead outside screw threads 46, 50, the screw shaft 44 operates in turnbuckle fashion to achieve linear translation of the inner mast jacket 12 equal to the sum of the pitches of the outside right-hand lead and the outside left-hand lead screw threads 46, 50 for each revolution of the screw shaft 44.

Figure 3:
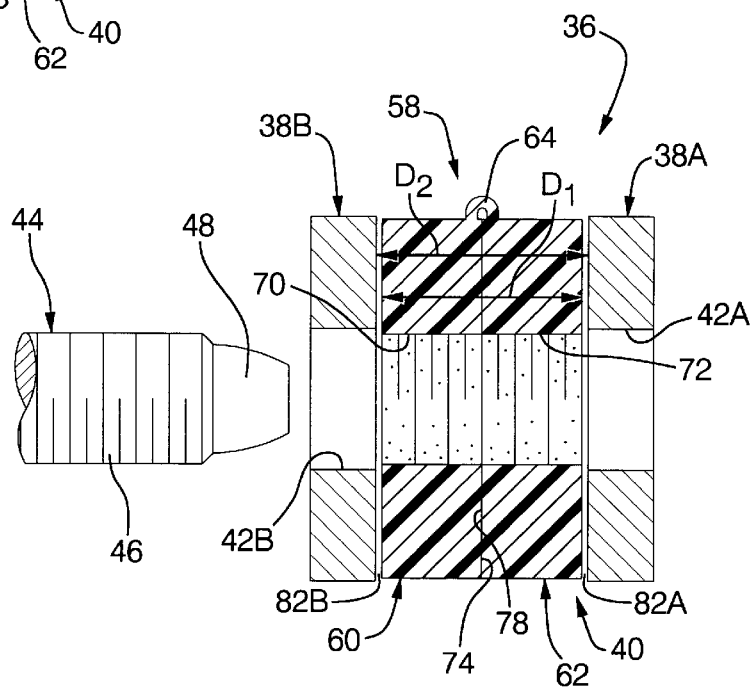
FIG. 3 is similar to FIG. 2 showing elements of the linear actuator according to this invention in different relative positions.
Figure 5:
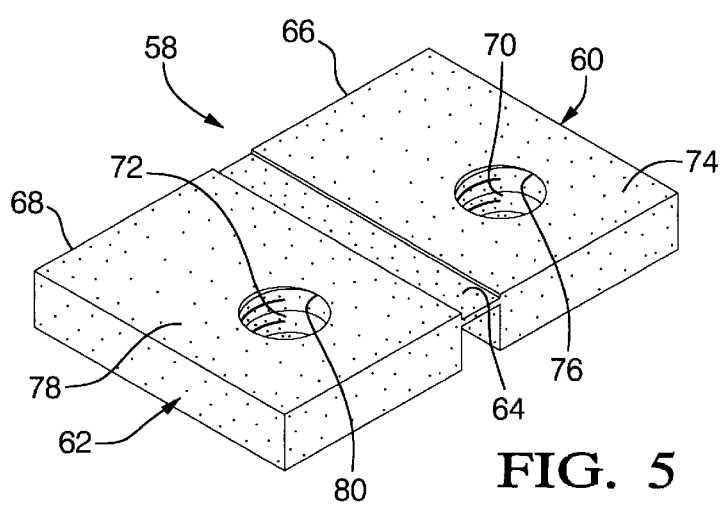
FIG. 5 is a perspective view of a molded plastic expandable nut of the linear actuator according to this invention.

As seen best in FIGS. 2–5, the expandable nut 58 is molded flat from a plastic such as acetal or any low friction compound with the front and the back segments 60, 62 side-by-side and interconnected by the integral living hinge 64. The thread groove in the front segment 60 defining the inside screw thread 70 is molded to intersect a flat side 74 of the front segment at 76. The thread groove in the back segment 62 defining the inside crew thread 72 is molded to intersect a flat side 78 of the back segment at 80. When the expandable nut 58 is folded at the living hinge 64 to juxtapose the flat sides 74, 78, FIG. 3, the inside screw threads 70, 72 in the front and the back segments are angularly "phased" relative to each other by 180°, i.e., the intersection 76 between the flat side 74 and the thread groove defining the inside screw thread 70 is angularly separated by 180° from the intersection 80 between the flat side 78 and the thread groove defining the inside screw thread 72. In addition, with the flat sides 74, 78 juxtaposed, a depth dimension "$D_1$" of the expandable nut 58 is less than a corresponding depth dimension "$D_2$" of the socket 40 between the lugs 38A, 38B so that a pair of clearances 82A, 82B, illustrated in exaggerated fashion in FIG. 3, are defined between the lugs 38A, 38B and corresponding ones of the front and the back segments of the expandable nut.

The angularly phased inside screw threads 70, 72 on the expandable nut 58 cooperate as described below with the right-hand lead outside screw thread 46 on the screw shaft 44 in eliminating lash between the screw shaft and the inner mast jacket 12, i.e., eliminating dimensional clearance which would otherwise permit relative linear translation between the screw shaft and the inner mast jacket parallel to the longitudinal centerline 20 of the steering column. The screw shaft 44 is first assembled between the inner and the outer mast jackets 12, 14 by concurrently screwing the left-hand lead outside screw thread 50 into the inside screw thread 54 on the lug 56 and the right-hand lead outside screw thread 46 into the inside screw thread 70 in the front segment 60 of the expandable nut 58 through the clearance hole 42B in the lug 38B. Due to the clearances 82A, 82B between the expandable nut and the lugs 38A, 38B, the expandable nut is initially loose in the socket 40 and self-aligns with the distal end 48 of the screw shaft as the latter rotates and advances so that expensive manufacturing procedures for assuring such alignment are not required.

When an outboard end, not shown, of the thread groove in the screw shaft 44 near the distal end 48 of the latter defining the right-hand lead outside screw thread 46 emerges from the inside screw thread 70 in the front segment 60 of the expandable nut, it is initially blocked from entering the thread groove in the back segment 62 defining the inside screw thread 72 because of the 180° angular phasing between the inside screw threads 70, 72. As the screw shaft 44 continues to rotate and advance toward the back segment 62 for serial threading into the inside screw thread in the back segment, the aforesaid outboard end of the thread groove in the screw shaft defining the right-hand lead outside screw thread 46 spreads apart the front and the back segments 60, 62 of the expandable nut until the outboard end reaches the site 80 where the thread groove in the back segment 62 defining the inside screw thread 72 intersects the flat side 78 and commences engagement with the inside screw thread 72.

With angular phasing of 180° between the inside screw threads 70, 72, the front and back segments 60, 62 are spread apart a distance of up to one-half of the pitch of the right-hand lead outside screw thread 46 on the screw shaft 44. The sum of the clearances 82A, 82B between the expandable nut and the lugs 38A, 38B defining the socket 40 is calculated to be less than the maximum distance by which the front and the back segments 60, 62 are spread apart so that each of the front and the back segments becomes resiliently wedged between the screw shaft 44 and a corresponding one of the lugs 38A, 38B, FIG. 3, before the aforesaid outboard end of the thread groove in the screw shaft defining the right-hand lead outside screw thread commences engagement with the inside screw thread 72. With the front and the back segments 60, 62 resiliently wedged between the lugs 38A, 38B and the screw shaft 44 and with the right-hand lead outside screw thread 46 engaging each of the inside screw threads 70, 72, rotation of the screw shaft on the outer mast jacket 14 induces linear translation of the inner mast jacket 12 relative to the outer mast jacket in the direction of the longitudinal centerline 20 of the steering column with zero lash between the screw shaft 44 and the inner mast jacket 12.

Having thus described the invention, what is claimed is:

1. A linear actuator between a pair of relatively moveable elements of a motor vehicle steering column comprising:

a socket on a first element of said pair of relatively moveable elements of said motor vehicle steering column, a pair of clearance holes in said socket, an expandable nut disposed loosely in said socket having a front segment and a back segment behind said front segment, means operative to prevent rotation of said expandable nut in said socket relative to said first element of said pair of relatively moveable elements of said motor vehicle steering column, an inside screw thread in said front segment of said expandable nut, an inside screw thread in said back segment of said expandable nut angularly phased relative to said inside screw thread in said front segment of said expandable nut, a screw shaft having an outside screw thread thereon traversing said socket through said clearance holes therein and concurrently threaded in each of said inside screw thread in said front segment of said expandable nut and said inside screw thread in said back segment of said expandable nut, and means operative to rotatably support said screw shaft on a second element of said pair of relatively moveable elements of said motor vehicle steering column so that rotation of said screw shaft induces relative movement between said first and said second elements of said steering column, said angular phasing between said inside screw thread in said front segment of said expandable nut and said inside screw thread in said back segment of said expandable nut causing said outside screw thread on said screw shaft to spread apart said front segment and said back segment of said expandable nut to positions resiliently wedged between said screw shaft and said socket when said outside screw thread on said screw shaft is threaded serially into said inside screw thread in said front segment and then into said inside screw thread in said back segment of said expandable nut;

wherein said means operative to prevent rotation of said expandable nut in said socket relative to said first element of said pair of relatively moveable elements of said motor vehicle steering column comprises a flat side on one of said front segment and said back segment of said expandable nut, and a flat side on said first element of said pair of relatively moveable elements of said motor vehicle steering column facing said flat side on said one of said front segment and said back segment of said expandable nut, and wherein said means operative to rotatably support said screw shaft on a second element of said pair of relatively moveable elements of said motor vehicle steering column comprises a second outside screw thread on said screw shaft having an opposite hand lead relative to said first outside screw thread on said screw shaft, and a lug means on said second element of said pair of relatively moveable elements of said motor vehicle steering column having an inside screw thread thereon cooperating with said second outside screw thread on said screw shaft in rotatably supporting said screw shaft on said second element of said pair of relatively moveable elements.

\* \* \* \* \*